Patented June 16, 1936

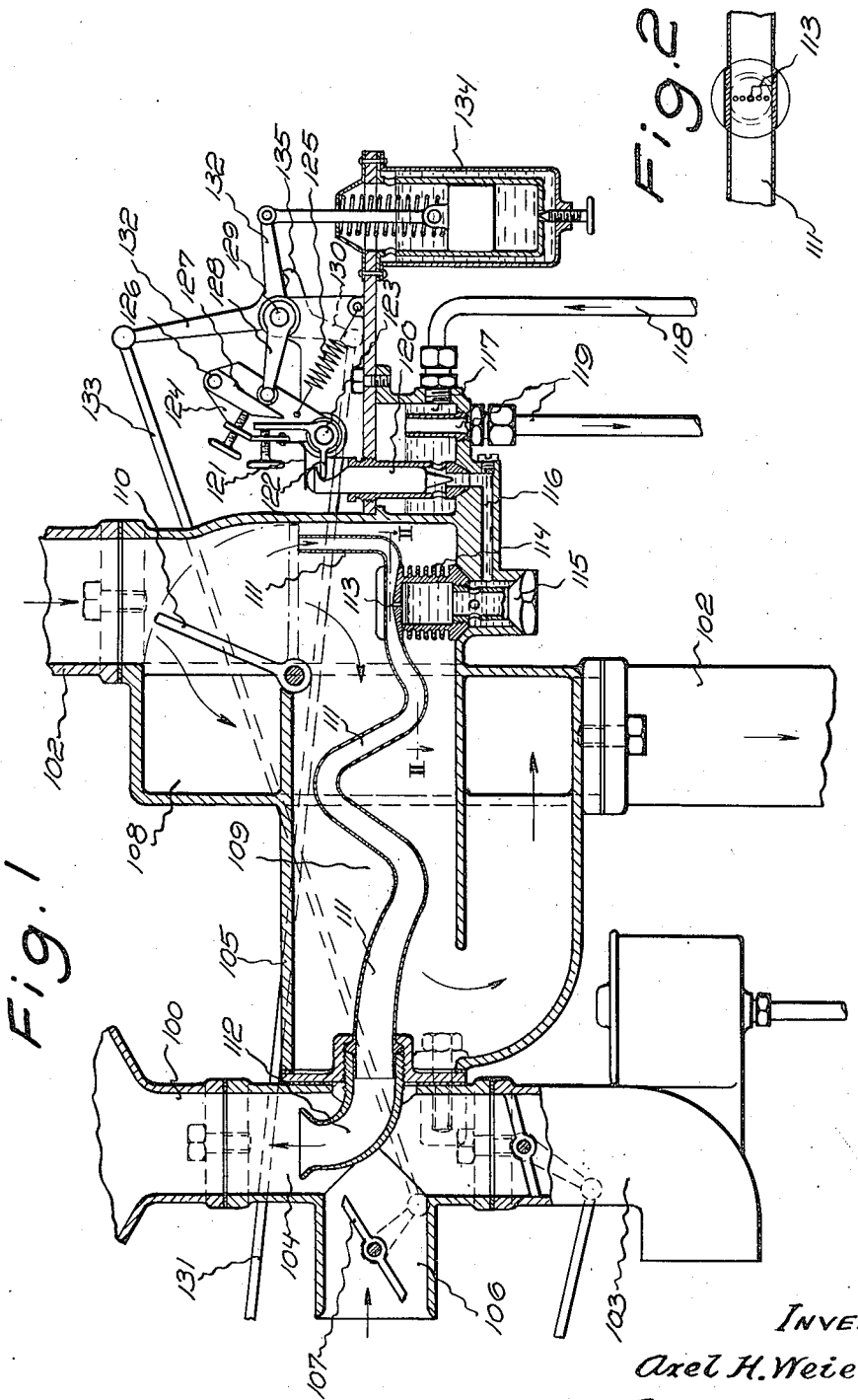

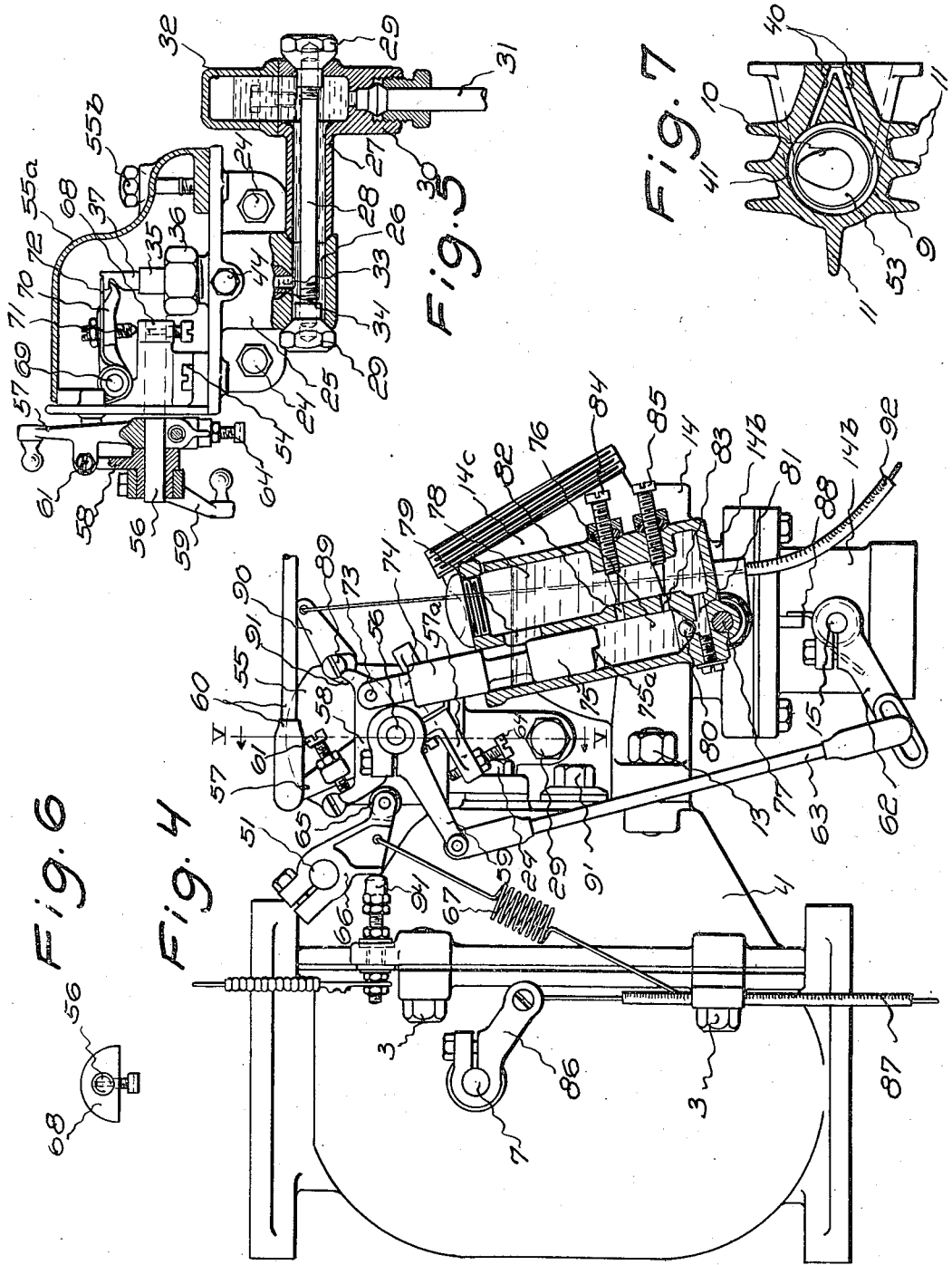

2,044,412

UNITED STATES PATENT OFFICE 2,044,412

CHARGE FORMING DEVICE FOR INTERNAL COMBUSTION ENGINES

Axel Hugo Weiertz and Per Axel Reinar Weiertz, Landskrona, Sweden

Application March 21, 1935, Serial No. 12,268
In Sweden March 23, 1934

14 Claims. (Cl. 123—119)

This invention relates to charge forming devices for internal combustion engines. More particularly, the invention relates to such a device which may be used as an attachment to petrol engines to enable the use of a heavy hydrocarbon oil as a fuel in such engines. The device is of the type in which the heavy fuel is vaporized through heating in a vaporizer before it is admixed with the combustion air drawn in by the engine. The heating is effected by the hot exhaust gases from the engine, and preferably a small quantity of the exhaust gases used for the heating is added to the fuel and used to assist in atomizing the liquid fuel to be vaporized as it enters into the vaporizer. The supply of the liquid fuel to the vaporizer is controlled by means of a valve, and after vaporization the vaporized fuel freely enters into the suction intake pipe or manifold of the engine and is admixed therewith with the combustion air which enters into the said pipe or manifold through a valve controlled air inlet.

According to the invention the power of the engine is controlled according to the demands by simultaneously controlling the said fuel and air valves which for this purpose are controllable by means of a common control mechanism. Further, according to the invention, the control valve in the air inlet is connected to a retarding mechanism such as a dash pot or the like which is active for retarding the movement of the air valve in relation to the movement of the fuel valve when moving said valves in the direction for decreasing or shutting off the fuel and air supplies to the vaporizer and to the intake pipe or manifold of the engine, respectively. This retardation of the movement of the air valve in relation to the movement of the fuel valve serves the purpose of creating a delay in the decrease of the air supply to correspond to the delay by which the quantity of vaporized fuel entering from the vaporizer into the intake pipe or manifold of the engines takes the value corresponding to the decreased supply of liquid fuel to the vaporizor. In this manner the excess of fuel in relation to air in the charge otherwise occasionally turning up when decreasing or shutting off the fuel and air supplies is avoided. Such an excess of fuel in relation to air in the charge drawn in by the engine is deleterious or harmful due to the incomplete combustion and the objectionable smoke and odor in the burnt gases and the deposits in the engine cylinders resulting therefrom.

Further objects of the invention are to provide a device of the character set forth, which is of a simple, practical and efficient construction, as is hereinafter described with reference to the accompanying drawings illustrating two preferred embodiments of the invention.

In the drawings:—

Fig. 1 is a longitudinal section of one of said embodiments of the charge forming device according to the invention.

Fig. 2 is a detail sectional view substantially on the line II—II in Fig. 1.

Fig. 4 is a side view, partially in section, of the device according to Fig. 3.

Fig. 5 is a detail sectional view substantially on the line V—V in Figs. 3 and 4.

Fig. 6 is a detail side view.

Fig. 7 is a detail sectional view.

Figure 3:
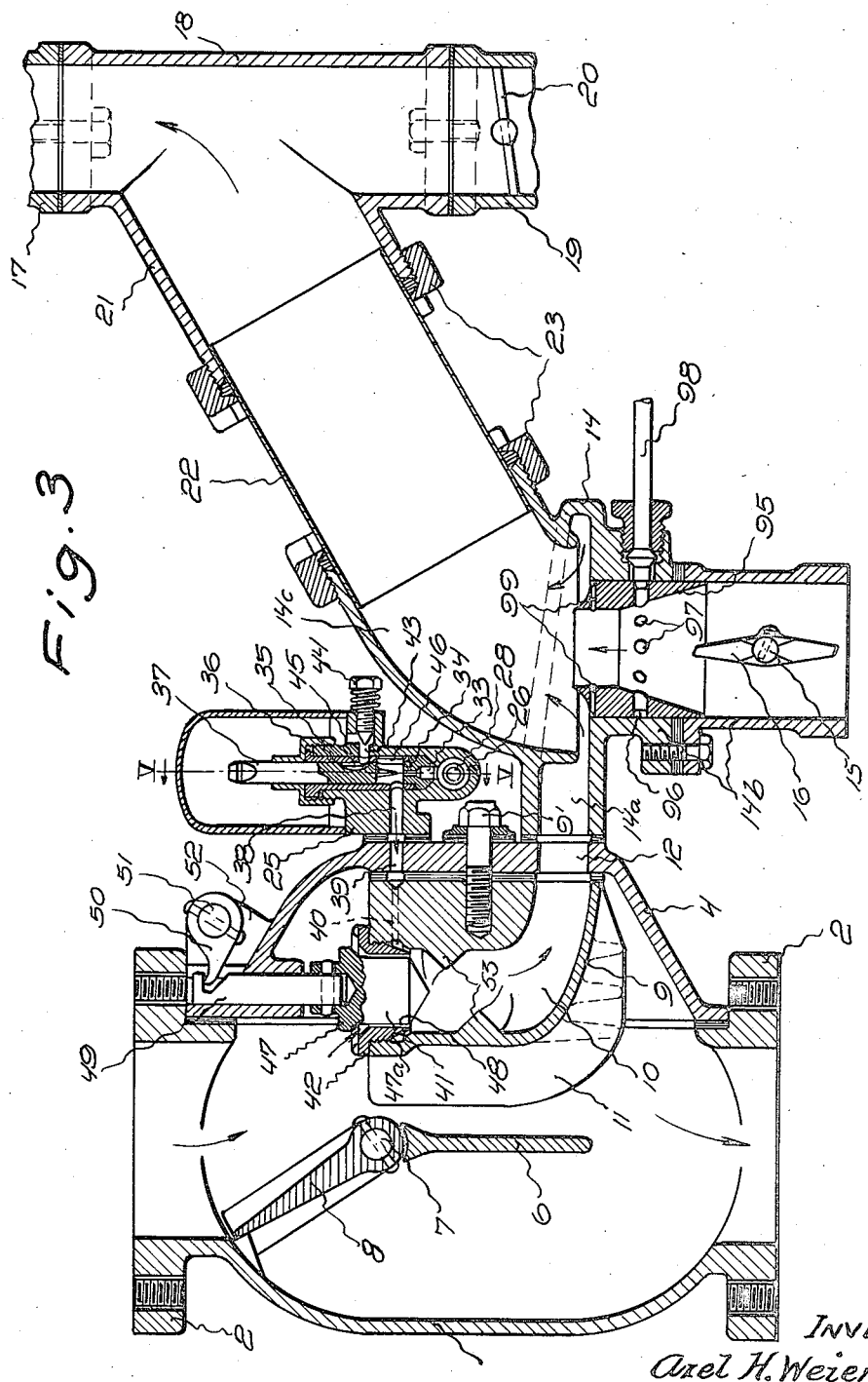
Fig. 3 is a longitudinal section of the other embodiment of the charge forming device according to the invention.

Referring to Fig. 1 in the drawings, 100 is the intake pipe or manifold of the engine, and 102 is the exhaust pipe of the same. A mixing chamber for the vaporized heavy fuel oil and the air forming the charge to be drawn in by the engine, is made in the shape of a piece of tubing 104 and mounted in the intake manifold between the engine and an ordinary petrol carburettor 103, the vaporizer for the heavy oil being mounted within a chamber 105 which is connected in the exhaust pipe 102 and adapted to be passed by the exhaust gases. The tubular mixing chamber 104 is provided with an air inlet 106 adapted to be controlled and closed by means of a throttle valve 107. The chamber 105 interposed in the exhaust pipe 102 is provided with two separate passages or channels 108 and 109 controlled by a switch valve flap 110. A vaporizing chamber in the shape of a tube 111 extends through the exhaust gas passage 109 and opens into the mixing chamber 104 preferably by means of a funnel-shaped nozzle 112 opening in the direction of flow of the air through said chamber. The tube 111 preferably is constructed with a cross sectional area which increases from the inlet end towards the outlet end of the tube, and preferably it is flattened in a gradually increasing degree in the direction from its outlet end towards its inlet end.

The inlet end of the vaporizing tube 111 preferably is positioned in such a manner that it is closed by the switch valve flap 110 when the latter is brought into a position completely closing the exhaust gas passage 109, and in this position of the said valve flap the whole amount of the exhaust gases is brought to pass the by-pass channel 108.

Furthermore, the tube 111 is mounted within the passage 109 in a manner that the exhaust gases sweep around the same when wholly or in part taking this way, and thereby a small portion of the said gases passes said tube 111 and enters the mixing chamber 104, or the intake manifold of the engine, both due to the pressure existing within the exhaust pipe and due to the suction arising within the intake manifold.

A number of restricted admission inlets 113 for the heavy fuel oil open into the tube 111 not far from the inlet end of the same (compare Fig. 2), such oil inlets being at hand at the upper end of a small and preferably cylindrical and hollow member 114 inserted in an opening in the under side of the tube 111 and positioned within the exhaust gas passage 109 so as to be swept by the exhaust gases passing the same, said hollow member preferably being provided with external ribs for increasing its heat transmitting surface.

In the embodiment shown in Fig. 1, the hollow member 114 is secured in a bore at the bottom of the chamber 105 by means of a sleeve-shaped screw 115, and by means of an oil channel 116 the interior of the same is connected to an oil chamber 117 preferably made integral with the chamber 105 which is passed and heated by the exhaust gases. The oil chamber 117 is provided with an oil supply pipe 118, and the oil level therein is adapted to be kept as constant as possible by a float controlled valve means or, for instance, by means of an overflow pipe 119.

The supply of the heavy fuel oil to the hollow member 114 from the oil chamber 117 is adapted to be controlled by means of a needle valve 120. In a closed position of said needle valve it is adapted to be pressed against its seat by means of a spring 121. One arm 122 of a bell crank lever extends into a recess in the valve stem and serves to lift the valve 120 from its seat, said bell crank lever being pivotally mounted on a shaft 123, and the other arm of the same being adjustably connected to an arm 124 pivotally mounted on the same shaft 123 and acted upon by a spring 125. The arm 124 is further provided with an abutment 127 adjustably mounted around a pin 126 and resting against a roller, or the like, on an arm 128 fixed on a rotatable shaft 129 provided also with another fixed arm 130 which is connected to a control member in the shape of a pedal, or the like, by means of a suitable connection member 131. A bell crank lever 132 is pivotally mounted on the shaft 129, one arm of said lever being connected with the air throttle valve 107 by means of a suitable connection member, whereas the other arm of said lever is connected with a delaying or retarding mechanism in the shape of a dash-pot 134 provided with a spring-pressed piston, or the like.

The arm 130 is provided with an abutment 135 adapted for coaction with the bell crank lever 132, and at rotation of the arm 130 for opening the valve 120 the said abutment rotates the bell crank lever 132 in a direction for opening the air throttle valve 107. At this rotation of the arm 130 the roller on the arm 128 moves downwardly along the straight edge portion of the abutment 127 so that the arm 124 is rotated in a direction to allow for lifting of the valve 120 by means of the spring 125. At rotation of the arm 130 in the opposite direction for closing the valve 120, the bell crank lever 132 is tilted back in a direction for closing the air throttle valve 107 under the action of the spring acting on the piston within the dash-pot, but the closing movement of the air throttle 107 is delayed or retarded by said dash-pot so that it is brought about with a certain amount of lag in relation to the closing of the fuel valve 120.

The ordinary petrol carburettor 103 is used in starting the engine and in idle operation of the same, and under such conditions the air throttle 107 is closed. When changing over to feeding the engine with the heavy fuel oil, the valve 120 and the air throttle 107 are opened, whereas the mixing throttle, or air passage, of the ordinary petrol carburettor 103 is closed, so that this carburettor is set out of action. The chamber 105 then has already been heated by the exhaust gases, of which at least a portion is conveyed though the passage 109 for heating the vaporizer 111 for the heavy fuel oil. A small portion of the hot exhaust gases passes through the tube 111 and serves as an atomizing agent for the oil when entering the vaporizing tube through the restricted bores 113. A rapid and complete vaporization of the heavy fuel oil is performed by the heat inherent in the portion of the exhaust gases passing the tube 111 and due to the heating of said tube by the exhaust gases sweeping around the same. The vaporization is effected without oxidation of the oil since the exhaust gases passing the vaporizing tube 111 do not contain any free oxygen, or in any case they are very poor in oxygen. Hence, in spite of the high temperature, no formation of coke and tar occurs within the vaporizing tube.

As the oil chamber 117 is in heat transmitting connection with the chamber 105 heated by the exhaust gases, a pre-heating of the heavy oil takes place already within said oil chamber. Before entering the vaporizing tube 111, the oil is still further pre-heated within the hollow member 114 swept by the exhaust gases. Together with the portion of the exhaust gases passing the tube 111, the vaporized heavy fuel oil from said tube enters the intake manifold of the engine, or the mixing chamber 104 connected thereto, and is mixed with the air drawn in through the air inlet 106.

Between the mixing chamber 104 and the engine there is no throttle or the like at hand in the path of the inflowing fuel mixture, on which the fuel can get a tendency to condense or accumulate in the shape of drops, but the fuel mixture has a free and unobstructed passage from the mixing chamber 114 to the engine cylinders, whereby the risk for a condensation of the vaporized fuel on its way to the cylinders is prevented, or in any case materially reduced. The high temperature attained by the vaporized fuel during its passage through the vaporizer 111 strongly heated by the exhaust gases does also assist herein in an essential degree.

During the running, the heating of the tube 111 may be controlled by adjustment of the switch flap valve 110 whereby a greater or smaller portion of the exhaust gases may be by-passed through the passage 108. The reduced suction effect of the lower degree of vacuum occurring within the intake manifold of the engine at a greatly open position of the air throttle 107, when running at high loads, and acting on the portion of the exhaust gases passing the tube 111 will be automatically compensated for in a required degree by the higher pressure occurring in the exhaust pipe at high loads.

When the supply of the heavy fuel oil is reduced or cut off by means of the valve 120, the air throttle 107 is closed with a sufficient delay for permitting a sufficient admission of air for a complete combustion of such vaporized fuel which during some little space of time still might pass to the engine, so that a formation of soot and tar within the engine, and an exhaust of fumes through the exhaust pipe, will be avoided also under such circumstances.

Referring to the embodiment of the invention illustrated in Figs. 3–7, 1 represents a housing provided at both ends with flanges 2 by which the housing is adapted to be connected in the exhaust pipe of the engine so that the exhaust gases pass through the housing 1. In one side the housing 1 has an opening closed by means of a cover 4 secured by means of bolts 3. In the housing 1 there is provided a vertical partition 6, and at the upper edge thereof on a shaft 7 there is journaled a switch flap valve 8. By adjustment of this valve the exhaust gases or a controllable portion thereof may be caused to pass on one side or the other of the partition 6. On the inside of the cover 4 there is secured by means of bolts 9' a hollow body 9 forming a bent channel 10 beginning in the upper side of the body 9 and ending in the side thereof facing the cover 4. The body 9 is so disposed that it is swept by the exhaust gases passing between the cover 4 and the partition 6 in the housing 1 and is highly heated thereby. For increasing the heat transmitting surface of the body 9 it may be provided with ribs 11. In the cover 4 there is provided an opening 12 in register with the opening of the channel 10 in the adjacent side of the body 9. On the outside of the cover 4 there is secured by means of bolts 13 a housing 14 having an inlet 14a communicating with the channel 10 in the body 9 through the opening 12 in the cover 4. On its under side the housing 14 is provided with an air inlet socket 14b in which there is provided a rotatable shaft 15 carrying a throttle valve 16. On its upper side above the air inlet socket 14b the housing 14 is provided with a bent outlet socket 14c adapted to be connected to the intake pipe or manifold 17 of the engine. The connection between the intake pipe 17 and the socket 14c preferably is constructed as shown in Fig. 3 and consists of a branch socket 18 connected between the intake pipe 17 and an ordinary petrol carburettor 19 having the usual throttle valve 20, the branch 21 on the socket 18 being connected to the socket 14c by means of a tube 22 and ordinary pipe-couplings 23.

On the outside of the cover 4 there is also secured by means of screws 24 a fuel valve housing 25. In its lower portion this valve housing 25 is provided with a transverse channel 26, and to one end thereof there is connected a tubular nipple 27 secured by means of a bolt 28 extending through the nipple and the channel 26 and provided with nuts 29 at both ends, which at the same time serve the purpose of closing the opposite ends of the nipple 27 and the channel 26, respectively. The nipple 27, preferably in its under side, is provided with a connection socket 30 for a fuel supply conduit 31 through which the liquid fuel is supplied from, for instance, a vacuum tank disposed at a suitable level above the charge forming device, so that the fuel is supplied under a moderate and substantially constant pressure. If a pump is used for delivering the fuel a pressure relief valve may be provided in the fuel supply conduit. On the nipple 27 there may be provided an air chamber 32 communicating with the interior of the nipple. In the valve housing 25 there is provided a passage 33 extending from the channel 26 and formed by a valve seat 34 secured in the lower end of a sleeve 35 fitted in a vertical bore in the housing 25 and secured by means of a nut 36 which at the same time serves as a guide for a needle valve 37 coacting with the valve seat 34 for controlling the fuel supply. In the housing 25 there is provided a channel 38 extending from an opening in the side of the sleeve 35 and having a continuation in the form of a bore 39 through the cover 4 and a bifurcated channel 40 in the body 9. The two branches of the bifurcated channel 40 open into an annular nozzle slot 41 (see also Fig. 7) formed around the lower end of a valve seat 42 secured in the upper end of the channel 10. In the valve housing 25 there is also provided an air inlet 43 which opens into the sleeve 35 through an opening in the side thereof. The air inlet 43 is adjustable by means of an adjusting screw 44 and can be put in communication with the fuel passage in the housing 25 through a recess 45 in the stem of the needle valve 37 and a recess 46 in the inside of the sleeve 35 when the needle valve is moved downwardly, that is towards closing position. Coacting with the valve seat 42 is a valve 47 having a cylindrical extension 47a leaving between it and the valve seat a narrow annular passage 48 opening adjacent to and immediately inside of the opening of the fuel nozzle slot 41. The valve 47 is suspended by means of a stem 49 guided in a vertical bore in the cover 4 and engaged with an arm 50 secured to a shaft 51 journaled in ears 52 on the outside of the cover 4. On the inner wall of the channel 10 just below the valve seat 42 there is provided a helical rib or thread 53 of a large pitch.

Secured to the upper side of the housing 25 by means of screws 54 is a bracket 55. Journaled in this bracket is a horizontal shaft 56 which outside of the bracket carries an arm 57 fixed to the shaft and an arm 58 which is rotatable on the shaft. On the hub of the arm 58 there is secured an arm 59. The arm 57 is adapted to be operatively connected to a pedal or the like by means of a rod 60 and carries an adjustable abutment screw 61 for actuation of the arm 58 to which the throttle valve 16 is operatively connected by means of an arm 62 on the shaft 51 and a link 63 connecting the arm 62 to the arm 59 secured on the hub of the arm 58. The arm 57 is also provided on a projection 57a with an abutment screw 64 or the like for actuation of an arm 66 (preferably provided with a roller 65) secured on the shaft 51. The arm 66 is actuated by a spring 67 biasing the arm towards fully open position of the valve 47. Secured to the inner end of the shaft 56 is an excenter or cam 68 (Figs. 5 and 6), and journaled on a shaft 69 on the bracket 55 is an arm 70 having its free end engaged in a notch in the stem of the fuel needle valve 37 and being provided with an adjustable screw 71 with which it rests on the excenter or cam 68. The needle valve 37 is actuated by a spring 72 tending to move the needle valve downwardly. Over the needle valve 37 and the control mechanism therefore now described there is provided a cover 55a secured to the housing 25 by means of screws 55b. Pivoted to the arm 58 by means of a bolt 73 is the piston rod 74 of a piston 75 movable within a cylinder 76 which at its lower end is pivotally connected to the housing 14 by means of a bolt 77. Preferably integral with the cylinder 76 is a chamber 78 communicating with the cylinder at its upper end through an opening 79 and at its lower end through an opening 81 provided with a check valve in the form of a ball 80 or the like. Further there is provided a number of communicating openings 82 and 83 between the cylinder 76 and the chamber 78, said openings being adjustable by means of adjusting screws 84 and 85. The cylinder 76 and the chamber 78 are adapted to contain a quantity of liquid such as oil or glycerin and form together with the piston 75 a dash-pot mechanism active for retarding the movement of the piston 75 in the downward direction.

The operation of the embodiment of the heavy fuel charge forming device according to the invention described with reference to Figs. 3–7 may be declared as follows. In the said figures the parts of the said device are shown in the positions occupied when the device is set for running the engine under full load, the throttle 20 of the petrol carburettor being closed so that the engine is fed only with heavy fuel. The exhaust gases from the engine pass through the housing 1 and highly heat the body 9 forming the vaporizer for the heavy fuel, and a small proportion of the hot exhaust gases pass through the open valve 47 and the narrow annular passage 48 to the channel 10 and assist in atomizing the liquid fuel entering the channel 10 through the nozzle slot 41. The gases and fuel entering and passing through the channel 10 are set in a rotary or turbulent motion by means of the helical rib or thread 53, and through this rotation or turbulence the fuel particles are thrown against the hot walls of the channel 10, whereby quick and complete vaporization of the fuel is obtained without formation of deposits. In the housing 14 and the socket 14c the fuel vapors co-mingle with the combustion air drawn in through the air inlet socket 14b, and the mixture or charge thus formed flows into the intake pipe or manifold 17 of the engine. The heating effect of the exhaust gases upon the vaporizer 9 can be varied or controlled by means of the switch valve 8, the shaft 7 of which for this purpose being provided with an arm 86 operable by means of a Bowden cable 87 or the like.

In order to decrease the engine power the arm 57 and thereby the shaft 56 is rotated in counter-clockwise direction as seen in Fig. 4. Hereby the fuel needle valve 37 is allowed to be moved downwardly by the spring 72 for decreasing the fuel supply, and at the same time the recess 45 in the stem of the needle valve 37 is put in communication with the recess 46 in the sleeve 35, so that when running the engine under moderate and low loads a small amount of air is drawn in and mixed with the fuel in the valve housing 25. At the said rotation of the arm 57 also the arm 58 and thereby also the arm 59 and the air throttle valve 16 are allowed to rotate, for instance under the action of a spring 88 (Fig. 4) on the shaft of the throttle valve, whereby the latter is moved towards closed position. This movement of the throttle valve 16 for decreasing the air supply to correspond to the decreased fuel supply is retarded, however, through the dash-pot mechanism connected to the arm 58. This retardation of the closing movement of the air throttle 16 in relation to the closing movement of the fuel supply valve 37 serves the purpose of preventing an occasional excess of vaporized fuel in relation to the air in the charge drawn in by the engine. Through the provision of the two throttle openings 82 and 83 in the dash-pot mechanism the retarding effect of this mechanism upon the closing movement of the air throttle valve 16 will be greater towards the end of said movement. The lower end of the piston 75 is provided with a recess 75a so that the position in which the greater retardation effect upon the closing movement of the air throttle valve 16 sets in can be altered by turning the piston half a revolution around its axis. The engine can be run idly on the volatile fuel or on the heavy fuel, as the case may be. In the latter case the idle running position of the charge forming device can be predetermined by means of an arm 90 pivoted to the bracket 55 by means of a screw 89 or the like and carrying an abutment 91 for the arm 57, the said arm 90 being operable for bringing the said abutment in the path of the arm 57 by means of a Bowden cable 92 or the like. Thus, it is necessary to use the ordinary petrol carburettor 19 only for starting the engine when cold. If the engine is restarted while still hot, it is possible to start directly on the heavy fuel. When completely shutting off the supply of the heavy fuel the abutment screw 64 on the arm 57 strikes the roller 65 on the arm 66 and rotates the latter against the action of the spring 67, so that the valve 47 is closed. For the arm 66 there is provided outside on the cover 4 an insulated stop screw 94 at the same time serving as a contact with which the arm 66 in the open position of the valve 47 makes contact for closing an electric signal circuit containing, for instance, a signal lamp. This lamp is glowing whenever the heavy fuel charge forming device is in operation.

Through the provision of the air chamber 32 in communication with the fuel supply conduit is obtained that, when the fuel valve 37 is lifted suddenly, the fuel flow through the valve is also suddenly increased without a sudden acceleration of the fuel in the whole fuel supply conduit.

When using a vacuum tank the evacuation thereof preferably is effected by means of an ejector disposed in the air inlet socket 14b, which consists of a cone 95 having an annular channel 96 and suction openings 97 to this channel 96 from the inside of the cone. The vacuum tank (not shown) is connected to the annular channel 96 by means of a conduit 98. The upper end of the cone 95 projects into the housing 14 and is provided with holes 99 for draining off any liquid fuel oil leaking through the fuel valve when the device is out of operation.

The charge forming device as described herein makes it possible to feed an ordinary petrol engine with a heavy fuel oil while obtaining complete and smokeless combustion under all conditions of operation. Further, the device is of a relatively simple construction and can be mounted without difficulty in most existing engines, especially automobile engines. Further the device, especially in the embodiment thereof illustrated in Figs. 3–7, is easy to put together and dismount for inspection and repair. For suiting the device to different engines it is only the housing 1 and the branch socket 18 which perhaps must be constructed somewhat differently according to special circumstances, while all other parts may be the same. Further the construction is such that the bracket 55 and the parts carried thereby can be mounted on either side of the device. The same is true as regards the nipple 27 and several other parts, and this is of some importance because of the fact that in many cases but a very restricted space is available for building in the device.

Of course the detail construction of the device can be varied within reasonable limits without departing from the spirit of the invention.

What we claim and desire to secure by Letters Patent is:—

1. A charge forming device for internal combustion engines, comprising in combination, a housing adapted to be connected to the exhaust pipe of the engine and to be passed by the exhaust gases, a vaporizer housed in said housing and adapted to be swept by the exhaust gases so as to be heated thereby, means for supplying liquid fuel to said vaporizer, including a valve means for controlling the fuel supply to the vaporizer, a socket adapted to be connected to the suction intake pipe of the engine and provided with an air inlet, the vaporizer being adapted to discharge the vaporized fuel into said socket for mixing the vaporized fuel with the air drawn in by the engine through said air inlet, a valve means for controlling said air inlet, means for simultaneously controlling said fuel valve means and said air valve means for the purpose of controlling the power of the engine, and a retarding means for retarding movement of said air valve in relation to movement of said fuel valve when moving said valves in a direction for decreasing the fuel supply to the vaporizer and the air supply to the intake pipe of the engine, respectively.

2. A charge forming device for internal combustion engines as claimed in claim 1, in which the vaporizer has an inlet to permit a small amount of the exhaust gases to enter the vaporizer to assist in atomizing the liquid fuel as it enters the vaporizer.

3. A charge forming device for internal combustion engines as claimed in claim 1, in which the vaporizer is in the form of a tube having a restricted inlet end for exhaust gases and a wider discharge end opening into the socket having the air inlet, and in which inlets for the liquid fuel into the vaporizer tube are provided in the form of narrow bores in the upper end of a hollow body projecting through an opening in the under side of the vaporizer tube near the said inlet end thereof.

4. A charge forming device for internal combustion engines as claimed in claim 1, in which the housing adapted to be connected to the exhaust pipe of the engine besides of an exhaust gas passage containing the vaporizer is provided with a passage for by-passing the exhaust gases or a controllable portion thereof in relation to said first-mentioned passage.

5. A charge forming device for internal combustion engines, comprising in combination, a housing adapted to be connected to the exhaust pipe of the engine and to be passed by the exhaust gases and provided with a side opening, a cover for said opening, a vaporizer in the form of a hollow body secured on the inside of said cover and adapted to be swept by the exhaust gases passing said housing so as to be heated thereby, means for supplying liquid fuel to said vaporizer, including a valve means for controlling the fuel supply to said vaporizer, said cover having an opening, a housing secured on the outside of said cover and forming a mixing chamber communicating with said vaporizer through said opening in said cover and having an air inlet and a mixture outlet adapted to be connected to the intake suction pipe of the engine, a valve means for controlling said air inlet, means for simultaneously controlling said fuel valve means and said air valve means for the purpose of controlling the power of the engine, and a retarding means for retarding movement of said air valve in relation to movement of said fuel valve when moving said valves in a direction for decreasing the fuel supply to the vaporizer and the air supply to the mixing chamber, respectively.

6. A charge forming device for internal combustion engines as claimed in claim 5, in which the said hollow body forms a vaporizing chamber in the shape of a bent channel extending from the upper side of said body to the side thereof facing the said cover.

7. A charge forming device for internal combustion engines as claimed in claim 5, in which the air inlet to the mixing chamber is in the form of an inlet socket on the under side of the housing forming the mixing chamber, the air control valve being provided in the form of a throttle valve in said inlet socket; and in which the mixture outlet from the mixing chamber is in the form of a bent outlet socket on the upper side of said housing above the said air inlet socket.

8. A charge forming device for internal combustion engines as claimed in claim 5, in which the fuel control valve is provided in a valve housing secured on the outside of the said cover and connected by means of fuel channels in the cover and the vaporizer body to a vaporizing chamber formed by said body and having the shape of a bent channel extending from the upper side of said vaporizer body to the side thereof facing the said cover, a valve controlled inlet for exhaust gases to said bent channel being provided in the upper end thereof.

9. A charge forming device for internal combustion engines as claimed in claim 5, in which the vaporizer body forms a vaporizing chamber in the shape of a bent channel extending from the upper side of said body to the side thereof facing the said cover; and in which a fuel inlet to said bent channel is in the form of an annular nozzle slot formed between the inside of said hollow body and a valve seat secured in the upper end of the said bent channel in the said body, a valve co-acting with said valve seat and adapted to admit a small amount of exhaust gases to the vaporizing chamber being provided with a cylindrical extension forming with the said valve seat a narrow annular passage opening adjacent to and immediately inside of the said annular nozzle slot.

10. A charge forming device for internal combustion engines as claimed in claim 5, in which said fuel control valve is located in a valve housing secured on the outside of said cover, and in which a bracket secured on said fuel valve housing carries a rotatable shaft provided with a cam for lifting the fuel valve and with a fixed arm adapted to be operatively connected to a pedal or the like, said shaft also carrying a loose arm adapted to be actuated by an abutment on the first-mentioned arm and connected with the air control valve in the air inlet to the mixing chamber and also with a dash-pot mechanism which is active for retarding closing movement of the air control valve in relation to closing movement of the fuel control valve.

11. A charge forming device for internal combustion engines as claimed in claim 5, in which said retarding means consist of a dash-pot mechanism so constructed as to have a greater retarding effect on the closing movement of the air control valve towards the end of this movement than at the beginning thereof.

12. A charge forming device for internal combustion engines as claimed in claim 5, in which the means for supplying liquid fuel to the vaporizer includes a valve housing for the fuel control valve and a fuel supply conduit connected to said valve housing by the intermediary of a nipple provided with an air chamber communicating with the fuel duct in the nipple.

13. A charge forming device for internal combustion engines as claimed in claim 5, in which the fuel control valve consists of a needle valve mounted in a valve housing provided with an air inlet controlled by the stem of said needle valve, for admixing a small amount of air with the fuel on its way to the vaporizer when running the engine at low and moderate loads.

14. A charge forming device for internal combustion engines as claimed in claim 5, in which the vaporizer body forms a vaporizing chamber in the shape of a bent channel extending from the upper side of said body to the side thereof facing said cover, and in which a fuel nozzle and a valve controlled inlet passage for exhaust gases open into the upper end of said channel, a helical rib of large pitch being provided on the wall of said channel below said fuel inlet nozzle and valve controlled exhaust gas inlet passage.

AXEL HUGO WEIERTZ.
PER AXEL REINAR WEIERTZ.